United States Patent
Giamati et al.

[19]

[11] Patent Number: 6,129,314
[45] Date of Patent: Oct. 10, 2000

[54] HYBRID DEICER WITH ELEMENT SEQUENCE

[75] Inventors: Michael J. Giamati, Akron; James C. Putt, Doylestown; David B. Sweet, Canal Fulton; Tommy M. Wilson, Jr., Stow, all of Ohio

[73] Assignee: The B. F. Goodrich Company, Charlotte, Minn.

[21] Appl. No.: 09/010,379

[22] Filed: Jan. 21, 1998

Related U.S. Application Data

[60] Provisional application No. 60/036,122, Jan. 21, 1997.

[51] Int. Cl.$^7$ ..................................................... B64D 15/12
[52] U.S. Cl. .................................. 244/134 R; 244/134 A; 244/134 D
[58] Field of Search ............................. 244/134 R, 134 A, 244/134 D

[56] References Cited

U.S. PATENT DOCUMENTS

| | | |
|---|---|---|
| 2,599,059 | 7/1952 | Jones . |
| 2,627,012 | 1/1953 | Kinsella et al. . |
| 3,022,412 | 2/1962 | Waters . |
| 4,561,613 | 12/1985 | Weisend . |
| 4,747,575 | 5/1988 | Putt et al. . |
| 4,826,108 | 5/1989 | Briscoe et al. . |
| 4,875,644 | 10/1989 | Adams et al. . |
| 5,098,037 | 3/1992 | Leffel et al. . |
| 5,129,598 | 7/1992 | Adams et al. . |
| 5,152,480 | 10/1992 | Adams et al. . |
| 5,427,332 | 6/1995 | Rauckhorst et al. . |
| 5,562,265 | 10/1996 | Rauckhorst . |
| 5,657,951 | 8/1997 | Giamati . |
| 5,657,952 | 8/1997 | Goldberg . |
| 5,904,322 | 5/1999 | Giamati et al. . |
| 5,921,502 | 7/1999 | Al-Khalil et al. . |

FOREIGN PATENT DOCUMENTS

| | | |
|---|---|---|
| 749 894 A2 | 12/1996 | European Pat. Off. . |
| 806 342 A2 | 12/1997 | European Pat. Off. . |

*Primary Examiner*—Peter M. Poon
*Assistant Examiner*—Tien Dinh
*Attorney, Agent, or Firm*—Richard A. Romanchik; Renner, Otto, Boisselle & Sklar

[57] ABSTRACT

A deicer comprises a skin heating device immediately subjacent an outer skin overlying an apex of a leading edge, and a skin deflection device immediately subjacent the outer skin chordwise aft of the apex. The skin heating device prevents the formation of ice over the apex and the skin deflection device deflects the outer skin to expulse ice formed chordwise aft of the apex. A controller controls the heating and deflection cycles to minimize power consumption of the deicer.

4 Claims, 12 Drawing Sheets

HYBRID DEICER WITH ELEMENT SEQUENCE

This application is a continuation of U.S. Provisional Application 60/036,122 filed Jan. 21, 1997.

FIELD OF THE INVENTION

This invention relates to deicers that remove ice accumulated on various aircraft surfaces during flight in atmospheric icing conditions, and more particularly to deicers which utilize both dynamic motion to expel the ice and thermal energy to melt the ice.

BACKGROUND OF THE INVENTION

In recent years, many aircraft manufacturers have sought improved ice protection systems to enable aircraft to safely fly in atmospheric icing conditions. Ice accumulations on the leading edge surfaces of various aircraft structures can seriously effect the aerodynamic characteristics of an aircraft. Examples of such aircraft structures include wings, engine inlets, and horizontal and vertical stabilizers. A leading edge is that portion of a surface of a structure that functions to meet and break an airstream impinging upon the surface of an aircraft structure. The impinging airstream is induced during flight. Conventional pneumatic deicers, electrothermal deicers and bleed air anti-icers have been used for many years to protect the leading edges of general aviation or commercial aircraft. These ice protection techniques are described in detail by Technical Report ADS-4, Engineering Summary of Airframe Icing Technical Data published by the Federal Aviation Agency, December 1963. In spite of these proven techniques, many aircraft manufacturers and operators have expressed a desire for new systems having better ice removal performance, longer life and decreased weight and energy requirements.

In response to this need, a class of systems has been developed that utilize skin deflection means to dynamically activate a thin deflectable outer skin upon which ice accumulates. The dynamic activation induces rapid motion in the thin deflectable skin sufficient to dynamically debond, shatter and expel an accumulated ice cap into surrounding airflow. As will be discussed more fully, the skin deflection means can take a variety of forms.

In some devices, the skin deflection means are combined with the thin deflectable outer skin to form a unitary deicer. The unitary deicer is generally formed in a thin sheet that can be subsequently bonded to the leading edge surface of an existing aircraft structure. The deicer is usually designed to be removed from the aircraft structure and replaced in the field requiring the use of a replaceable adhesive such as 3M 1300L rubber cement. Examples are presented in U.S. Pat. No. 4,706,911 METHOD AND APPARATUS FOR DEICING A LEADING EDGE, Briscoe et al. (hereinafter referred to as the Pneumatic Impulse Patent), U.S. Pat. No. 4,875,644 ELECTRO-REPULSIVE SEPARATION SYSTEM FOR DEICING, Adams et al. (hereinafter referred to as the Electro-Repulsive Patent), and U.S. Pat. No. 5,129,598 ATTACHABLE ELECTRO-IMPULSE Deicer, Adams et al. (hereinafter referred to as the Electro-Impulse Patent). In other devices, the skin deflection means are combined with the thin deflectable outer skin and a reinforcing structure thereby forming a unitary leading edge structure with integral de-icing capability. The deicer is permanently bonded to the reinforcing structure necessitating replacement of the entire assembly upon failure of the deicer. An example of this type of device is presented in U.S. Pat. No. 5,098,037 STRUCTURAL AIRFOIL HAVING INTEGRAL EXPULSIVE SYSTEM, Leffel et al. (hereinafter referred to as the Integral Expulsive System Patent). For the purposes of this application, the structure to which the deicer is attached will be referred to as the "substructure." Examples of substructures include an existing aircraft structure having a leading edge surface and a reinforcing structure as discussed above.

As mentioned previously, the skin deflection means can take a variety of forms. In the Electro-Repulsive Patent, the skin deflection means comprises an upper array of conductors and a lower array of conductors. The upper conductors are substantially parallel to each other and to adjacent conductors in the lower layer. The upper conductors are connected in series with the lower conductors so that a single continuous conductor is formed that passes from the upper layer, around the lower layer, back around the upper layer, and so on. Upon application of an electrical potential to the input leads, current is developed in the upper conductors that is in the same direction in all upper conductors. Likewise, current is developed in the lower conductors that is in the same direction in all lower conductors, but opposite to the direction of the current in the upper conductors. As explained in the Electro-Repulsive Patent, maintaining a constant current direction in all the conductors of a layer greatly increases the separation force between the two layers.

After installation of the deicer on a substructure, the upper and lower conductors are sandwiched between the structural member and a surface ply (the surface ply is analogous to a thin deflectable skin). Upon application of a high magnitude short duration current pulse, opposing electromagnetic fields in the upper and lower layers forcefully repel each other. This motion induces a dynamic motion into the surface ply which dynamically removes accumulated ice. As described in the Electro-Repulsive Patent, a current pulse that rises to between 2300 and 3100 amperes within 100 microseconds generates effective ice removal. A circuit for generating such a pulse is described in the Electro-Repulsive Patent. The circuit includes a pulse forming network, but this is not absolutely necessary.

Another form for the skin deflection means utilizing electromagnetic apparatus is illustrated by the Electro-Impulse Patent. A planar coil comprising at least one coiled conductor is sandwiched between a surface ply and a conductive substructure (such as the leading edge of an aluminum aircraft structure). Planar coils are described in great detail in U.S. Pat. No. 5,152,480 PLANAR COIL CONSTRUCTION, Adams et al. (hereinafter referred to as the Planar Coil Patent). As described in the Electro-Impulse Patent, a high magnitude short duration current pulse is applied to the coil. The current in the coil induces a strong rapidly changing electromagnetic field. The electromagnetic field generates eddy currents in the conductive substructure which, in turn, generates an opposing electromagnetic field. The two electromagnetic fields repel each other causing a repelling force between the coil and the substructure. The coil induces dynamic motion into the surface ply thereby dynamically removing accumulated ice. Effective ice removal is generated by a peak current of about 3000 amperes rising in a period of 100 microseconds. An electrical circuit for generating such a pulse is disclosed. The circuit is very similar to the circuit disclosed in the Electro-Repulsive Patent.

In the previous example, the skin deflection means is composed of a single unitary planar coil. A target may also be required if the substructure does not have sufficient electrical conductivity to effectively develop eddy currents.

A target would be required with a fiber reinforced plastic substructure, or a conductive substructure that is too thin to effectively develop eddy currents. The target is a sheet of conductive material such as copper or aluminum that is located adjacent one surface of the coil. The coil and target are forcefully repelled from each other upon application of a high magnitude short duration current pulse to the coil due to opposing magnetic fields generated by current in the coil and by eddy currents in the target. This motion induces dynamic motion into the surface ply which dynamically removes accumulated ice. The target can be formed as a part of the substructure or can be formed as a part of the thin force and displacement generation means. Also, as described in the Electro-Impulse Patent, either the target or the coil can be located immediately subjacent the outer skin. The target applies the motive force to the skin if it is located subjacent the skin. Conversely, the coil applies the motive force to the skin if it is located subjacent the skin.

The Planar Coil Patent also teaches an electro-repulsive variation similar to the Electro-Repulsive Patent. Two mirror image unitary planar coils are superposed relative to each other and electrically connected so that upon application of a high magnitude short duration current pulse to each coil, current direction is opposite in each coil. Opposing electromagnetic fields are generated in the coils which causes each coil to forcefully repel the other. This motion induces a mechanical impulse into the surface ply which removes accumulated ice. This approach differs from the Electro-Repulsive Patent which utilizes a single conductor to form the upper and lower conductors.

A type of skin deflection means that utilizes pressurized gas is described in the Pneumatic Impulse Patent and the Integral Expulsive System Patent. A plurality of pneumatic impulse tubes extend in a spanwise direction subjacent a thin deflectable outer skin. The tubes and skin are supported by a fiber reinforced plastic substructure which together form a leading edge structure with integral de-icing capability. Special fittings are integrated into the tubes at various locations spaced along the span of each tube. A pneumatic impulse valve is attached to each fitting. A suitable valve is described in U.S. Pat. No. 4,878,647 PNEUMATIC IMPULSE VALVE AND SEPARATION SYSTEM, Putt et al. The valve contains a small volume (about 1 cubic inch) of high pressure air (500 to 5,000 psig). Upon activation by a solenoid, the valve quickly releases the pressurized air into each tube via the fitting. The expanding air pulse causes the tube to expand and induce mechanical motion into the skin thereby dynamically expelling accumulated ice. The expanding air pulse most preferably inflates the tube in less than 500 microseconds.

As evidenced by these patents, many variations of skin deflection means have been developed. The Electro-Repulsive Patent, Electro-Impulse Patent, Planar Coil Patent, Pneumatic Impulse Patent, and Integrated Pneumatic Impulse Patent provide examples of the types of structure that can serve as skin deflection means. In each example, the skin deflection means generates a force that causes the skin to be deflected away from the substructure. These patents are intended to be merely representative, and the types of structures that can serve as skin deflection means is not limited to the specific teachings of these patents.

The devices described above represent advancements over previous de-icing systems. In spite of these advancements, means of improving ice removal performance, life, reliability, weight, and energy consumption are of continuing interest. In particular, a deicer is desired exhibiting the excellent ice removal performance typical of the devices described above while having increased life, reduced weight, and reduced energy consumption.

SUMMARY OF THE INVENTION

The invention comprises a deicer adapted for attachment to a substructure, the deicer having an outer skin that meets and breaks an impinging airstream when attached to the substructure, the substructure having an apex corresponding to the portion of the deicer and substructure underlying the area of the outer skin where the radius of curvature is smallest, the deicer comprising:

a heater disposed beneath the outer skin at a first area near the apex of the substructure for heating the outer skin when energized to thereby melt any ice accumulated thereover into water;

at least one skin deflector disposed beneath the outer skin at a second area for deflecting the outer skin away from the substructure when energized; and controller for periodically cycling the skin deflector a predetermined dwell time after the heater is energized.

DETAILED DESCRIPTION

Figure 1:
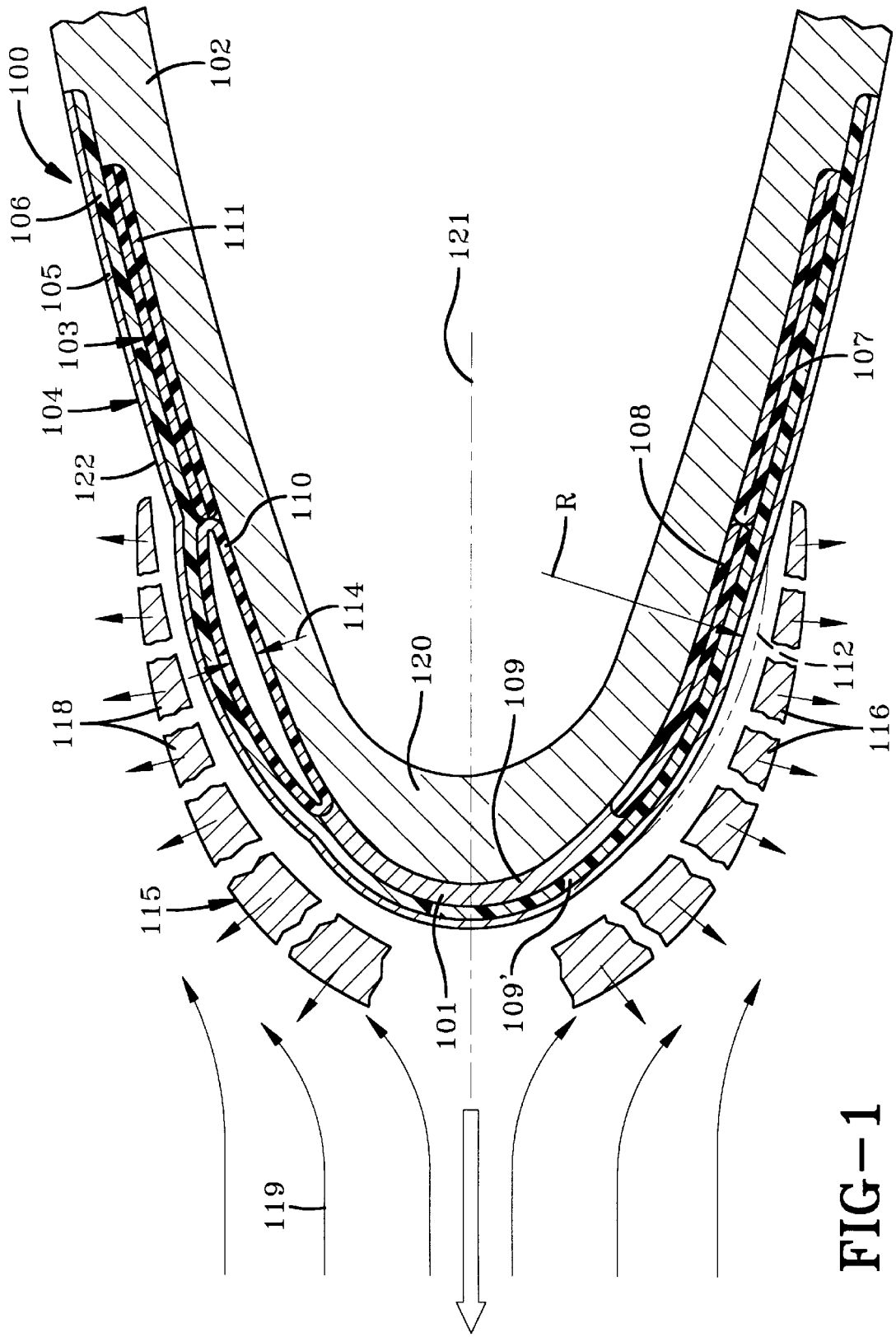
FIG. 1 is a fragmentary sectional view of a deicer in accordance with a first embodiment of the present invention.

Referring now to FIG. 1, a deicer 100 embodying the invention is shown attached to a substructure 102. Centerline 121 bisects deicer 100 and substructure 102 at the deicer apex 120. Deicer 100 and substructure 102 have a chordwise and spanwise direction. The chordwise direction is defined as being approximately parallel to the direction of an impinging airstream 119 as it passes around the deicer 100 and substructure 102. The deicer 100 and substructure 102 also extend in a spanwise direction which is generally perpendicular to the chordwise direction. The deicer and substructure can either be straight or have curvature in the spanwise direction. If deicer 100 is applied to an engine inlet, the spanwise direction corresponds to the circumference of the inlet. In practicing the invention, the spanwise curvature can generally be ignored. Therefore, for the purposes of this application, the term "curvature" refers only to curvature measured in the plane of the chordwise section. The section shown in FIG. 1 is a chordwise cross-section. Deicer 100 has an outer surface 122 which meets and breaks the impinging airstream. The outer surface 122 has a radius of curvature R, measured perpendicular to the outer surface 122, that changes depending on the chordwise position along the outer surface 122. Deicer 100 comprises a thin deflectable skin 104, a skin heating means 101, and a skin deflection means 103. In the embodiment presented, the skin deflection means 103 comprises four expandable tubes 107–111. The tubes are activated by sequentially releasing small quantities of compressed gas into each tube as described by the Integral Expulsive System Patent, U.S. Pat. No. 5,098,037, which is fully incorporated herein by reference. As discussed hereinafter, the skin deflection means 103 can also take forms utilizing electromagnetic apparatus. Examples are presented in U.S. Pat. Nos 4,678,144, 5,129,598, 5,152,480, 5,047,497, 4,501,398, 5,553,815, and 5,429,327, the disclosures of which are fully incorporated herein by reference. Unless noted otherwise, the discussion that follows relates with equal force to dynamic deicers that utilize skin deflection means comprising electromagnetic apparatus. Skin heating means 101 may be any of a number of heating apparatus known to those in the skilled in the art. Examples of such heating means are presented in U.S. Pat. Nos 2,599,059, 2,992,317, 5,351,918, 5,475,204 and U.S. Patent Reexamination Certificate No. 4,386,749, the disclosures of which are fully incorporated herein by reference.

In the embodiment presented, skin heating means 101 divides the skin deflection means 103. The skin deflection means 102 are disposed adjacent the skin heating means 101. The substructure 102 provides the structural integrity necessary to absorb and resist flight loads and unexpected impacts with foreign objects. The substructure can be formed from a metal, such as aluminum, or fiber reinforced plastic materials that are commonly used on aircraft such as epoxy impregnated glass or graphite fabrics. The skin 104 includes a backing layer 105 and a layer of erosion resistant material 106. The backing layer 105 can be formed from fiber reinforced plastic material, such as nitrile phenolic or epoxy impregnated into a fabric composed of fibers belonging to one of a group including carbon fibers, glass fibers, and nylon fibers. The erosion layer 106 can be formed from rubber, metal, or plastic, such as neoprene, titanium foil, polyether-ether-ketone film, polyurethane film, and polyurethane paint depending on the application. The erosion layer 106 is necessary to provide resistance to impact from rain, sand, and other debris that would damage the backing layer 105. The skin 104 must have elastic properties. The term "elastic" refers to the tendency of a material to return entirely to its rest state within a short period of time after an imposed force is removed. The skin 104, skin deflection means 102, and substructure 102 can be permanently bonded together to form a unitary structure with integral ice removal capability as described in the Integral Expulsive System Patent. Alternatively, the skin 104 and skin deflection means 103 can combined into a unitary structure which is then attached to an existing aircraft substructure 102.

Skin heating means 101 may be provided behind either the erosion layer 106 or the backing layer 105, and serves either to prevent the formation of ice on the erosion layer 106 over the heating means 101, or to melt ice which may have accumulated.

In the embodiment presented, the skin deflection means 103 consists of four expandable tubes 107–111. The expandable tubes 107–111 can be formed from fiber reinforced plastic material such as nitrile phenolic coated nylon fabric, or rubber coated fabric such as neoprene coated nylon fabric. The deicer 100 is activated by sequentially releasing small quantities of compressed air into the tubes 107–111 as described in the Pneumatic Impulse Patent or Integral Expulsive System Patent. Inflation of a tube is preferably achieved in less than 0.1 second and most preferably in less than 500 microseconds.

Deicer 100 is shown in an activated state by inflation of tube 110. Tubes 107, 108 and 111 are shown not inflated. Rapid inflation of tube 110 deflects the skin 104 outward developing tension in skin 104. This movement must occur rapidly enough to debond and shatter the ice cap 115 and eject the side ice-pieces 118 into the impinging airstream 119 where they are swept away from the deicer 100. The compressed air is subsequently vented from tube 110, and the skin 104 snaps back to its rest position due to the elastic properties of the skin 104. The process is repeated by inflation of tube 108 resulting in removal of side ice-pieces 116.

Achieving ice removal with prior electromechanical deicers was only achieved by stretching the skin. Likewise achieving ice removal with prior thermal deicers was only achieved by heating the skin. In contrast, deicer 100 of FIG. 1 achieves deflection of the skin 104 by two mechanisms; (1) stretching the skin 104 behind the apex of the airfoil, and (2) heating the skin over the apex of the airfoil. A certain maximum deflection 114 is necessary in order to achieve ice removal. The maximum deflection 114 depends on the materials and application, but generally ranges from 0.020 inch to 0.060 inch. Preventing ice formation over the apex of the deicer decreases the required level of force generation in the skin deflection means 103 necessary to achieve ice removal over the skin deflection means. Reducing the level of force generation in the skin deflection means 103 decreases the tension in skin 104. Stress in the skin deflection means 103 is reduced by decreasing the level of force generation. Likewise, stress in the skin 104 is reduced by reducing the level of tension. Therefore, the invention provides a means of reducing the stress levels in the components of a dynamic deicer. As discussed previously, reducing the stress levels increases life. The superior life resulting from the invention has been demonstrated in several bench tests.

The decreased tension in skin 104 required to obtain a desired deflection also improves energy consumption and weight. As mentioned previously, the invention decreases stress in skin 104 and permits decreased force generation in the skin deflection means 103. Since less force is required, less material is required to absorb and distribute reaction forces from the skin deflection means 103. The substructure 102, skin deflection means 103, and skin 104 can all be lighter in weight since the invention reduces the force each must withstand.

Since less force is required to deflect the skin 104, less energy is required to generate that force. For skin deflection means utilizing expandable tubes, lower peak tube pressures are required which decreases valve supply pressure. Lower supply pressure results in a lighter valve and solenoid, lighter supply lines and a lighter compressor. For thin force and displacement generation means utilizing electromechanical apparatus, the supply voltage and resulting current can be decreased. Decreasing the voltage and current requirements results in lighter supply lines, lighter switching hardware, and lighter energy storage devices.

Additional weight and energy savings are gained in a pneumatic impulse ice protector embodiment. Pneumatic impulse valves, of the type described in U.S. Pat. No. 4,878,647 PNEUMATIC IMPULSE VALVE AND SEPARATION SYSTEM, Putt et al., are spaced along the spanwise length of a expandable tube (pneumatic impulse tube). The distance between valves depends on the pulse propagation distance as previously discussed in relation to deicers 100 and 200 of FIGS. 1 and 2. The pulse propagation distance of a deicer similar to deicers 100 or 200 is limited by the stiffness of the outer skin. The pulse propagation distance of deicer 100 is greater because the skin 104 of deicer 100 is easier to deflect. For example, if skin 104 is formed from 0.005 inch thick 15–3 titanium alloy, the pulse may generate effective ice removal about four feet on either side of a valve. Therefore, the distance between valves must be about eight feet in order to provide effective ice removal along the span of a tube. Two valves per tube would be required for a sixteen foot span. For an ice protector having five tubes, a total of only ten valves would be required. However, deicer 100 presents a further advantage since its active area is the same as the active area of deicer 100, but deicer 100 has only four tubes. In other words, deicer 100 would require only eight valves compared to the sixteen valves required by deicer 100. In this hypothetical example, the number of valves has been reduced by one-half. Reducing the number of valves reduces energy consumption, weight, cost, and complexity of the system. Fewer valves also increases the reliability because the resulting system has many fewer mechanical components.

The invention also produces improvements in ice removal performance. In general, the ice removal performance of a dynamic deicer is strongly related to how quickly the outer skin moves. As the movement rate of the surface increases, minimum ice removal thickness decreases along with the quantity of residual ice left after ice cap removal. In general, a surface frequency response of at least 2000 hertz and a deflection of at least 0.020 inches and a peak acceleration of at least 1000 g (1 g=32.2 f/s^2) is desirable.

In general, the dynamic frequency response of a thin deflectable skin is increased by increasing its modulus of elasticity. Materials having an elevated modulus of elasticity and a tendency to transmit rather than damp dynamic motion are preferred. For the purposes of this application, an "elevated modulus" means a modulus of elasticity greater than 40,000 kPa. Examples of desirable materials for the backing layer 105 include but are not limited to fiber reinforced plastics which are preferred over natural or synthetic rubbers. Fiberglass or carbon fiber reinforced nitrile phenolic or epoxy are particularly useful. Materials having less of a tendency to absorb and damp dynamic movement are also desirable in order to minimize the amount of impulse energy absorbed by the backing layer 105. As much of the impulse energy as possible should be transmitted to the ice layer. Kevlar generally is not desirable because of its tendency to absorb and damp the dynamic motion induced by the skin deflection means.

As a part of the skin, mechanical properties of the layer of erosion resistant material also perform an important role in the ice removal performance of dynamic deicers. In particular, materials having an elevated modulus of elasticity and a tendency to transmit rather than damp dynamic motion exhibit the best ice removal properties. Examples of such materials include plastic films, such as polyurethane or polyether-ether-ketone and metal foils such as titanium, aluminum, or stainless steel. These materials generally perform better than low modulus materials such as natural or synthetic rubber, and polyurethane elastomer. These materials exhibit better ice removal performance for two reasons. First, they generally have less of a tendency to absorb and damp the dynamic motion induced by the skin deflection means. Dynamic energy tends to be absorbed and dissipated in a low modulus erosion layer rather than being efficiently transmitted to the ice layer. Second, ice removal is partially achieved by changing the surface curvature to develop shear stresses along the adhesion line at the interface of the ice cap and the erosion layer. These shear stresses contribute to destroying the adhesion along the interface, thereby releasing the ice cap to be ejected from the deicer surface. Low modulus materials tend to distribute and dissipate the shear stresses along the interface. Elevated modulus materials tend to concentrate shear stresses along the interface. Examples of suitable materials include metal foils, such as titanium, or plastic films, such as polyether-ether-ketone or polyurethane. Because of these effects, a deicer with a low modulus surface generally leaves more residual ice, and cannot remove thicknesses of ice as thin as a deicer having an elevated modulus surface. Further discussion of preferred deicer skins is found in U.S. Pat. No. 5,553,814, the disclosure of which is fully incorporated herein by reference.

Another important advantage of the invention can now be appreciated. The preceding discussion emphasizes that, for the best ice removal performance, the skin materials should be selected from a group of materials having an elevated modulus and a tendency to transmit rather than damp dynamic motion. As discussed previously, deflection of a high modulus skin requires more force with a deicer similar to deicers 100 or 200 than with a deicer similar to deicer 100 having a skin heating means 101. Decreasing the force increases the life of a dynamic deicer. Therefore, deicer 100 permits use of an elevated modulus skin 104, and the attendant ice removal performance, while maintaining lower stress levels and a longer life.

As discussed previously, ice removal over the apex of deicers 100 and 200 may prove unsatisfactory depending on the geometry. Specifically, removing ice over an apex from a surface having a radius of curvature less than 0.50 inch can be difficult. Removing ice over an apex having a radius of curvature less than 0.25 inch is particularly difficult. As evidenced by deicer 100, the invention provides a means whereby the ice removal over an apex is not an issue due to the ability of heating means 101 to prevent its formation entirely.

The best skin deflection means arrangement depends on a variety of factors that can vary greatly depending on an airframe manufacturer's specifications. Such factors include, the leading edge geometry, flight characteristics, maximum thickness of ice that can be tolerated, cost, life, reliability and weight. FIG. 1 shows on arrangement, however, depending on the application, ice removal performance may require use of other arrangements. Optimizing the design is a process that iterates between bench testing and icing wind tunnel testing. Life tests, rain erosion tests, dynamic tests and icing wind tunnel tests are cyclically performed with an eye toward improving each property. Changing the design to improve one of these factors may have an adverse effect on another. The rain erosion test parameters described in the Integrated Pneumatic Impulse Patent are particularly useful for determining rain erosion characteristics. Dynamic tests can be considered as a subset of icing wind tunnel tests since improving skin dynamics usually improves ice removal performance. A Polytech Model No. OFV 100 laser vibrometer system has been found to be very effective for bench testing designs in order to determine dynamic displacements, velocities, and accelerations at various locations on the skin. In general, a peak skin acceleration of at least 3000 g's (1 g=32.2 f/sec$^2$) at a peak frequency of at least 2000 hertz with a peak deflection of 0.020 inch is desirable. Much greater accelerations may be necessary depending on ice removal requirements.

Figure 2:
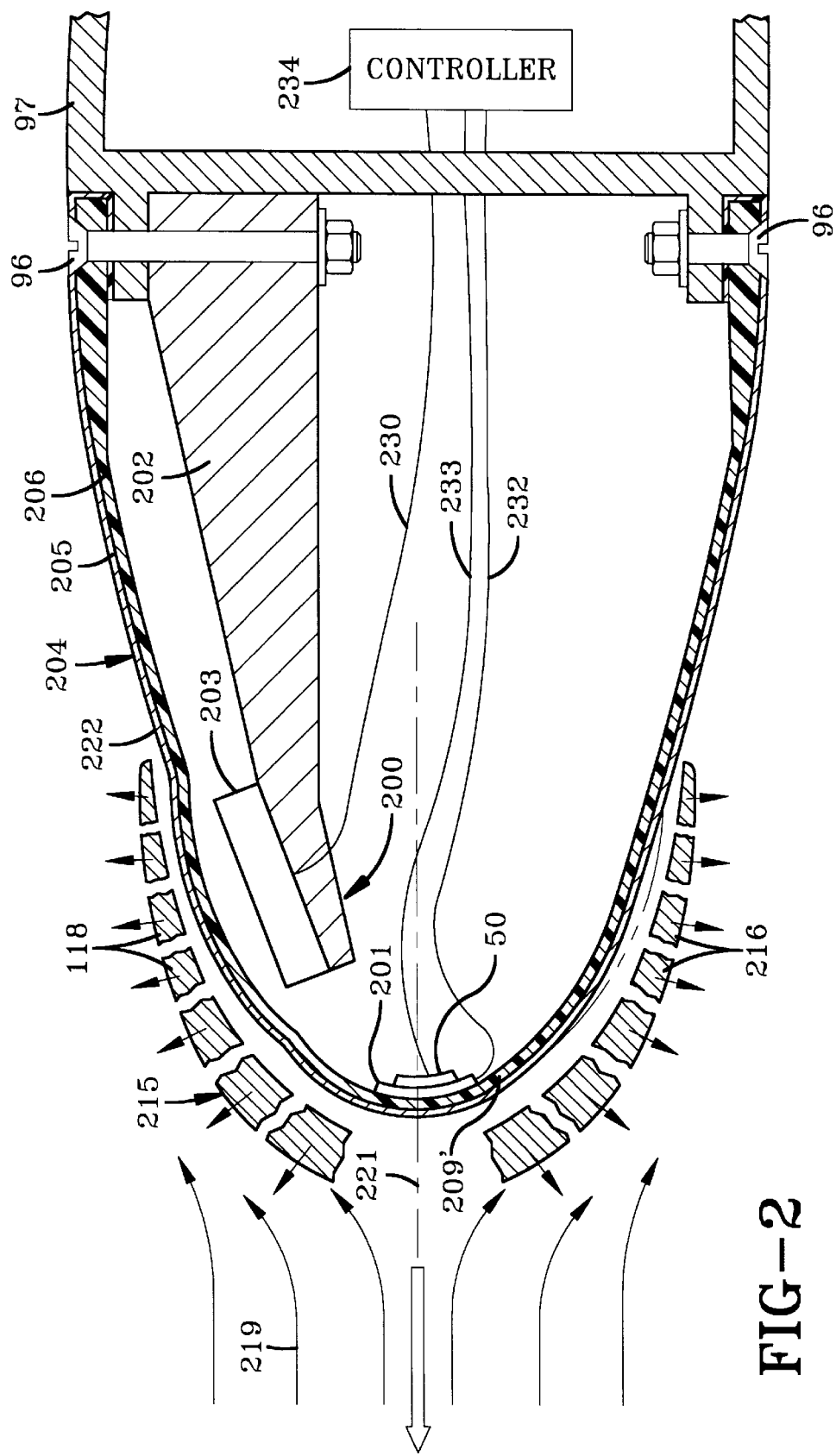
FIG. 2 is a fragmentary sectional view of a deicer in accordance with a second embodiment of the present invention.

Referring now to FIG. 2, a deicer 200 in accordance with an alternative embodiment of the present invention is shown attached to a substructure 202. Centerline 221 bisects deicer 200 and substructure 202 at the deicer apex 220. Deicer 200 and substructure 202 have a chordwise and spanwise direction. The chordwise direction is defined as being approximately parallel to the direction of an impinging airstream 219 as it passes around the deicer 200 and substructure 202. The deicer 200 and substructure 202 also extend in a spanwise direction which is generally perpendicular to the chordwise direction. The deicer and substructure can either be straight or have curvature in the spanwise direction. The section shown in FIG. 2 is a chordwise cross-section. Deicer 200 has an outer surface 222 which meets and breaks the impinging airstream. The outer surface 222 has a radius of curvature R, measured perpendicular to the outer surface 222, that changes depending on the chordwise position along the outer surface 222. Deicer 200 comprises a thin deflectable skin 204, a skin heating means 201, and a skin deflection means 203. In the embodiment presented, the skin deflection means 203 comprises an electro impulse deicer (EIDI) for inducing eddy currents in skin 205. A temperature sensor or transducer 50 is disposed adjacent the skin heating means 201 and can be used for temperature control of the heating means 201. Specifically, device 203 is preferably an inductor coil. Primary electric current pulses provided via a line 230 from a controller 234 flow through the coil, thereby inducing eddy currents in the metal skin 205. The magnetic fields produced by the primary current and eddy currents interact so as to cause deformation of the skin 205. A further discussion of EIDIs is provided in the aforementioned U.S. Pat. No. 4,678,144 to Goehner et al. The EIDI system is comprised of coils available from Aero-Electric Corporation of Russia. Skin heating means 201 is similar to those described hereinbefore, and is provided current via a line 232 from controller 234. Heating means 201 is preferably an electrothermal heater. Temperature sensor 50 provides an electrical signal indicative of the temperature of heating means 201 via a line 233 to controller 234.

Heater 201 preferably heats the skin continuously once an icing condition is encountered. Any ice accumulating over the heater will melt and the resulting water will run back and refreeze chordwise aft of the stagnation line 221. Skin deflection means 203 is periodically cycled to remove any such runback refreeze ice and any other ice that otherwise accumulates.

It is to be noted that a skin deflection means is shown on only one side of the airfoil. It has been found that only deflection means on top of the airfoil may be necessary to effectively remove all ice from the airfoil, thereby saving cost in weight, energy and expense.

Figure 3:
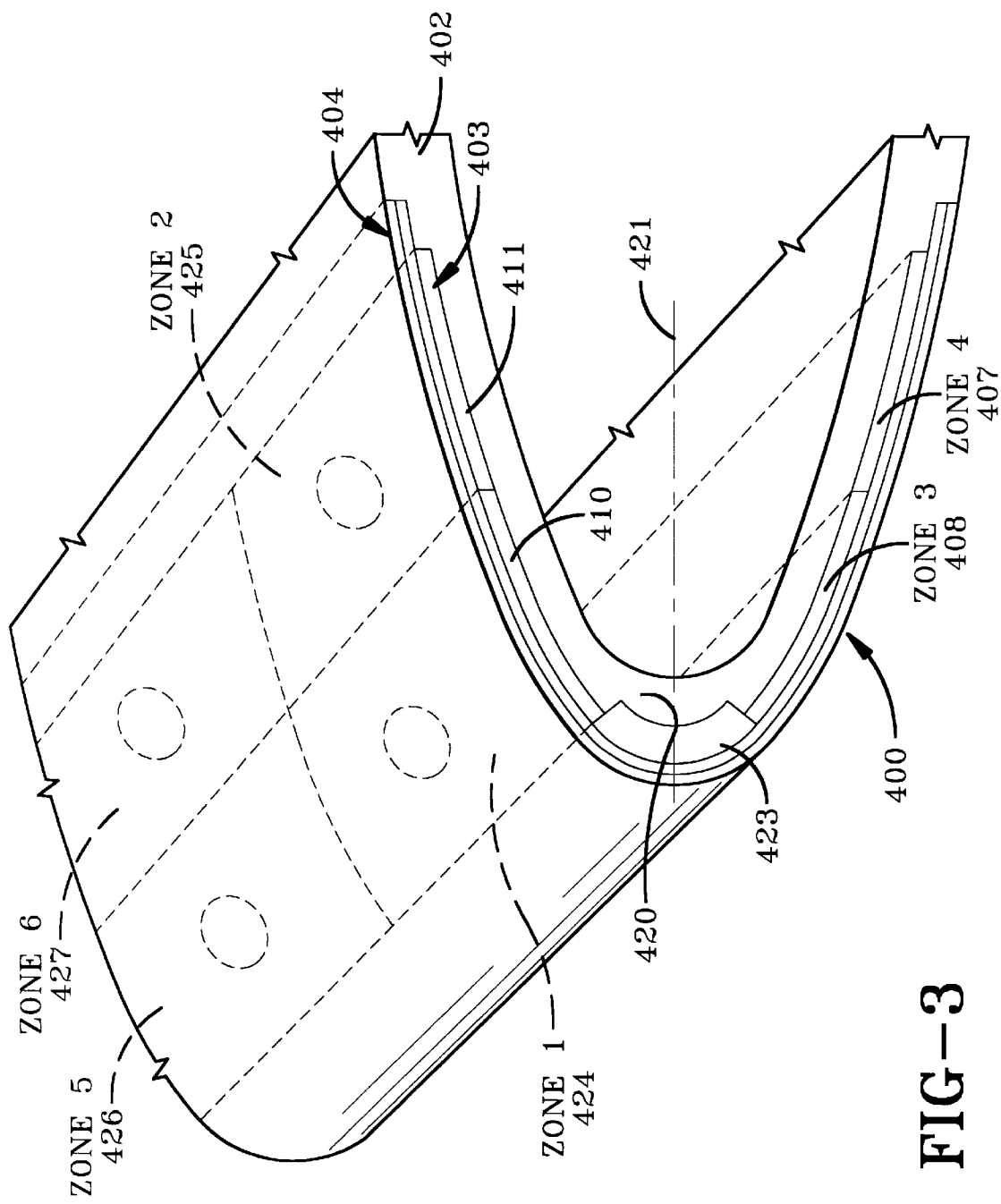
FIG. 3 is an isometric view of a deicer incorporating electromagnetic apparatus attached to a substructure.

Referring now to FIG. 3, a deicer 400 is shown attached to a substructure 402. Deicer 400 is comprised of a skin 404, skin deflection means 403, and a skin heating means 423.

The substructure 402 and deicer have an apex 420 and are bisected by a centerline 421. The skin deflection means 403 of deicer 400 is comprised of several separation assemblies spaced along the span of deicer 400 underlying the skin 404. This feature is different than previous embodiments using expandable tubes because tubes can easily run the length of a span whereas coils are more confined in their extent. Larger coils inherently have a larger electrical resistance which results lower peak current and lower separation force. The active area of each separation assembly is defined by segments 424–427. Segments are similarly defined overlying the opposing portion of substructure 402 which are not in view as presented in FIG. 4. Separation assemblies 407–411 are spaced around the substructure 402 in the chordwise direction. Separation assemblies 411 and 410 abut along one edge of each separation assembly. Separation assembly 410 (and the coil within) abuts the skin heating means 423 along one edge. Separation assemblies 407 and 408 are similarly arranged overlying the opposing portion of substructure 402.

In operation, heat is continuously applied by heating means 423, and a high magnitude current pulse is applied sequentially to the leads of each separation assembly. The separation assembly coils repel the skin away. This action can be induced by either an EIDI system or an electrorepulsive separation system.

Though discussed in terms of individual separation assemblies, several separation assemblies could be formed into a single unitary blanket.

Figure 4:
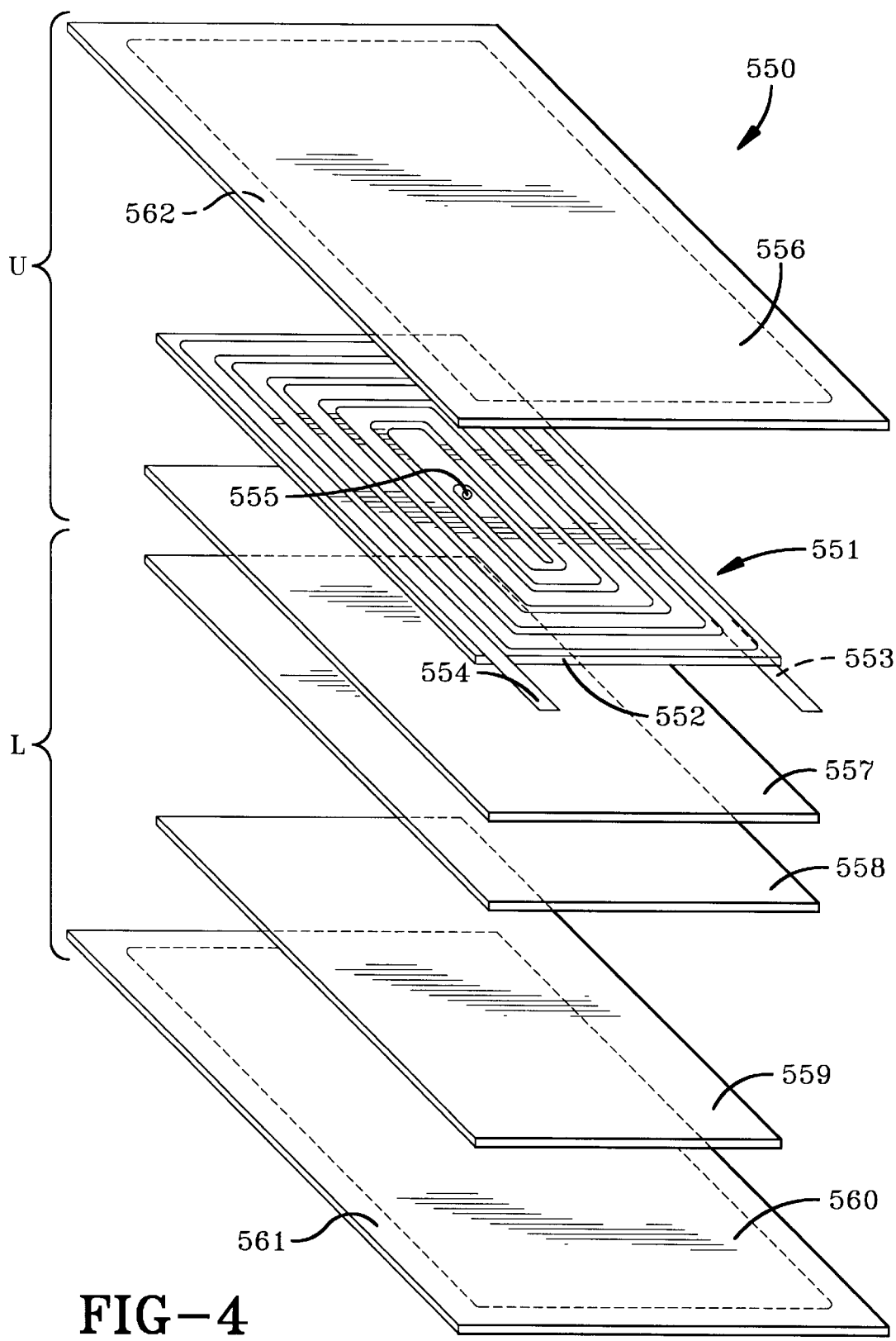
FIG. 4 is an exploded isometric view of an electro-impulse embodiment for a skin deflection means.
Figure 5:
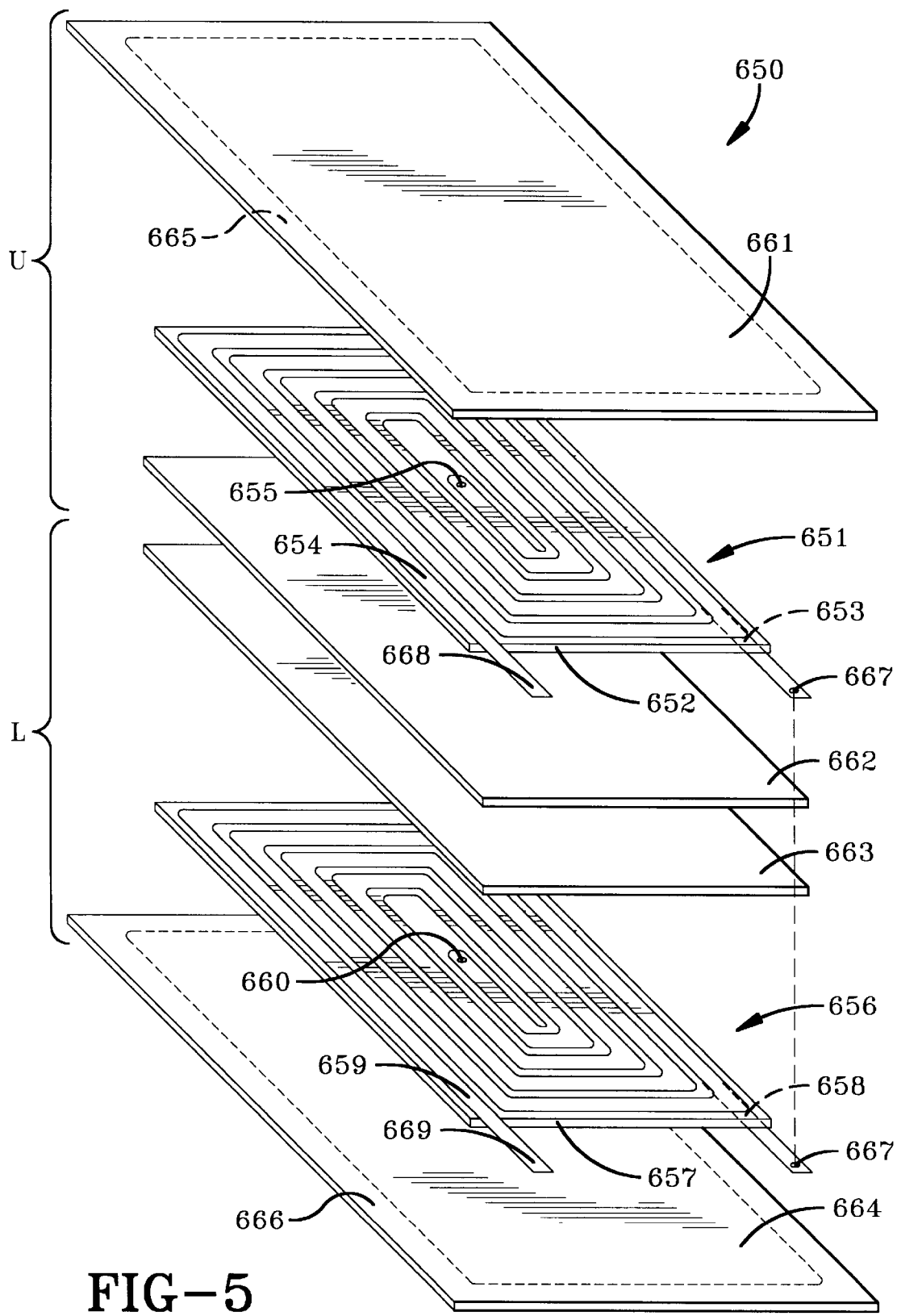
FIG. 5 is an exploded isometric view of an electro-repulsive embodiment for a skin deflection means.

Examples of two types of electromagnetic apparatus that can be employed as skin deflection means are presented in FIGS. 4 and 5. These are intended to be viewed only as examples of the different types of skin deflection means that can be used in combination with the claimed invention. The types of structures that can be used in the practice of the claimed invention are not limited to the examples shown.

The electromagnetic apparatus of FIG. 4 comprises an eddy current separation assembly 550. Eddy current separation assembly 550 includes a planar coil 551, an upper dielectric layer 556, a coil dielectric layer 557, a target dielectric layer 558, a target 559, and a lower dielectric layer 560. The planar coil 551 includes two coil members 553 and 554 disposed on the opposite sides of a dielectric carrier 552. The coil members 553 and 554 are mirror images of each other as described in the Planar Coil Patent. An electrical connection 555 is provided at the center which electrically connects the two coils. A small copper rivet has been found useful in forming electrical connection 555, but a weld is more preferable. The coil members 553 and 554 are most preferably formed from etched copper foil, but other materials may be used as described in the Planar Coil Patent. The dielectric carrier 552 can be formed from any material having good mechanical and dielectric properties such as plastics, fiber reinforced plastics, and synthetic rubbers.

Planar coil 551 is encapsulated between upper dielectric layer 556 and coil dielectric layer 557. The target 559 is encapsulated between target dielectric layer 558 and lower dielectric layer 560. The upper dielectric layer 556, coil 551, and coil dielectric layer 557 together form an upper member indicated by the letter U. The lower dielectric layer 560, target 559, and target dielectric layer 558 together form a lower member indicated by the letter L. The upper member U and lower member L are joined along an upper bond perimeter 562 and lower bond perimeter 561 forming a assembly.

The target 559 is superposed next to the coil 551. Electrical leads (not shown) are attached to the coil members 553 and 554 and are also encapsulated between upper and lower dielectric layers 556 and 560. Target 559 is formed from conductive material such as copper or aluminum sheet. The various dielectric layers are formed from materials having good dielectric and mechanical properties. Examples of such materials are plastics, reinforced plastics, and synthetic rubbers.

Upon application of a large magnitude transient potential to the coil 551, a large magnitude transient current is generated in the coil and eddy currents are formed in the target 559. The upper member U is forcefully repulsed from the lower member L. The upper member U is not bonded to the lower member L in the area between the coil 551 and target 559 thereby permitting movement. The active area is roughly defined by the area of the target 559 or planar coil 551. Apparatus for achieving a shaped large magnitude current pulse is presented in the Planar Coil Patent.

The electromagnetic apparatus of FIG. 5 comprises electro-repulsive separation assembly 650. Upper coil 651 is composed of two coil members 653 and 654 disposed on opposite sides of a dielectric carrier 652. The coil members 653 and 654 are arranged the same as coil members 553 and 554 of planar coil 551. Electrical connection 655 connects the ends of the coil member 654 and 653 through the dielectric layer at the center. Lower planar coil 656 is composed of two coil members 658 and 659 disposed on opposite sides of a dielectric carrier 657. Planar coil 656 is identical to planar coil 651. Electrical connection 660 connects the ends of the coil members 658 and 659 through the dielectric layer at the center. A small copper rivet has been found to be useful for this purpose, but a weld is preferred.

Upper planar coil 651 is encapsulated in an upper dielectric layer 661 and an upper coil dielectric layer 662 thereby forming an upper member U. Lower planar coil is encapsulated in a lower dielectric layer 664 and lower coil dielectric layer 663 thereby forming a lower member L. The upper and lower members U and L are joined at the upper and lower bond perimeters 665 and 666 which forms the separation assembly 650. The upper coil 651 is superposed over the lower coil 651 such that the conductors in each are substantially aligned. The upper member U and lower member L are not bonded together in the area between the coils 651 and 656. An electrical connection 667 is formed between the ribbon lead extending from coil member 653 and the ribbon lead extending from coil member 658. The connection is shown as a dashed line because FIG. 5 is an exploded view and the ribbon leads are actually adjacent to each other. Separate electrical leads (not shown) are electrically connected (not shown) to an upper coil lead 668 and a lower coil lead 669. The electrical connections are encapsulated in the upper and lower dielectric layers 661 and 664.

During operation, a high magnitude transient potential is applied across the leads 668 and 669. The potential induces a high magnitude transient current, in the coils 651 and 656. The current direction in any conductor of the upper coil members 653 or 654 will be substantially opposite to the current direction in the adjacent conductor of the lower coil members 658 or 659. Because the current direction is opposite, the upper coil members 653 and 654 forcefully repel the lower coil members 658 and 659. The upper member U is thereby forcefully repelled and displaced from the lower member L. The active area of the separation assembly is defined by the area of the planar coils 651 and 656. T h e coils depicted in FIGS. 4 and 5 have been referred to as "planar" coils. The term "planar" is intended to refer only to the thin sheet-like qualities of the coil as described in the planar coil patent. The coils depicted in FIGS. 4 and 5 could be formed to a curved surface if they are constructed of sufficiently flexible materials. If the materials are not sufficiently flexible, the coils could be cured to shape under heat and pressure in a mold or press.

Other variations not specifically presented are also considered to be within the purview of this invention. For example, the target 559 of FIG. 5 may not be required if the substructure is sufficiently conductive. In this case, the thin force and displacement generation means would constitute only the upper member U of FIG. 5. Several upper members could be consolidated into a single blanket as discussed above. Also, the skin heating means has consistently been shown centered on the apex. It could be shifted away from the apex in the chordwise direction as long as a portion of the skin heating means still overlies the apex. Shifting the skin heating means may be desirable depending on the geometry. Finally, in all of the embodiments disclosed thus far, the active area has been symmetric with respect to the centerline. Depending on the application, the active area could be shifted so that active area overlying one portion of the substructure is greater than the active area overlying the opposing portion. Also, the geometry of the substructure and deicer has been depicted as symmetric about the centerline. In most applications, the active area and leading edge geometry will not be symmetric about the centerline.

Manufacture of the present invention may be accomplished as described in commonly owned U.S. Pat. No. 5,553,814 to Rauckhorst, III et al., the disclosure of which is fully incorporated herein by reference.

Figure 6:
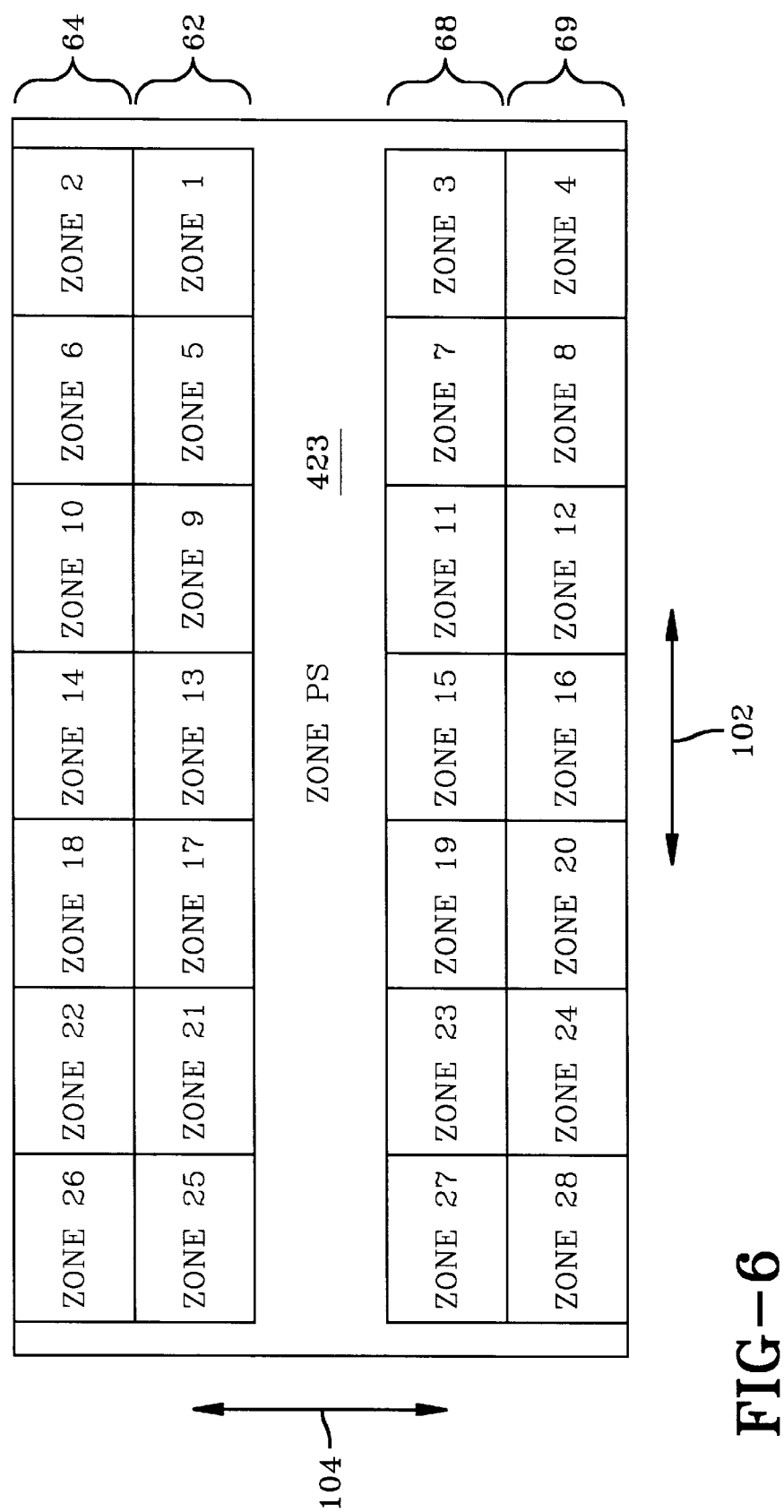
FIG. 6 is a plan view of an deicer having a parting strip and a plurality of deicing zones in accordance with the present invention.

Referring now to FIG. 6, a plan view is presented of de-icer 110 of FIG. 3. Primary skin deflection means 62 are defined by ZONES 1, 3, 5, 7, 9, 11, 13, 15, 17, 19, 21, 23, 25, 27 and secondary skin deflection means 64 are defined by ZONES 2, 4, 6, 8, 10, 12, 14, 16, 18, 20, 22, 24, 26, 28. Each ZONE 1–28 is a shedding zone in which ice is allowed to accumulate, and then subsequently removed by applying power or energy to the corresponding deflection means. The secondary shedding zones are immediately aft of the primary shedding zones. The parting strip zone (and elements) may be disposed immediately fore of a primary shedding zones (and elements). According to one embodiment, the parting zone is disposed between two primary shedding zones. Each shedding zone is generally aligned with the spanwise direction 102 of the structural member, and the area of each zone is defined by the area over which each deflection means is distributed, as shown in FIG. 3.

Still referring to FIG. 6, the two primary shedding zones are bisected by a parting strip designated as ZONE PS. The parting strip zone has a strip that is generally aligned with the spanwise direction 102 interconnecting two chordwise strips generally aligned with the chordwise direction 104. The chordwise direction 104 is the direction in which an impinging airstream passes around the de-icer and structural member. The spanwise direction 102 is generally perpendicular to the chordwise direction 104. The area of ZONE PS is defined by the area over which the parting strip heating element is distributed. According to a preferred embodiment, the ZONE PS is located in the stagnation region and extends in a spanwise direction 102 of the airfoil, and has a width sufficient to lie beneath the stagnation line in all critical flight conditions. The secondary zones are located immediately aft of the primary zones in a chordwise direction 104. Secondary zones cover both the predicted water droplet or ice particle impingement area and some areas where runback ice is expected. The primary and secondary zones are cycled such that the over all shed cycle will maintain ice thicknesses within an airfoil design criteria. The controller cyclically energizes the various zones by cyclically energizing and de-energizing the skin deflection means disposed beneath the zones. A deflection means is energized by applying an electrical or mechanical energy to the deflection means, and de-energized by removing the energy. Typically energization and de-energization will occur over a very short period of time, typically in the millisecond range, wherein a short duration, high energy pulse is supplied to the deflection means.

Figure 7:
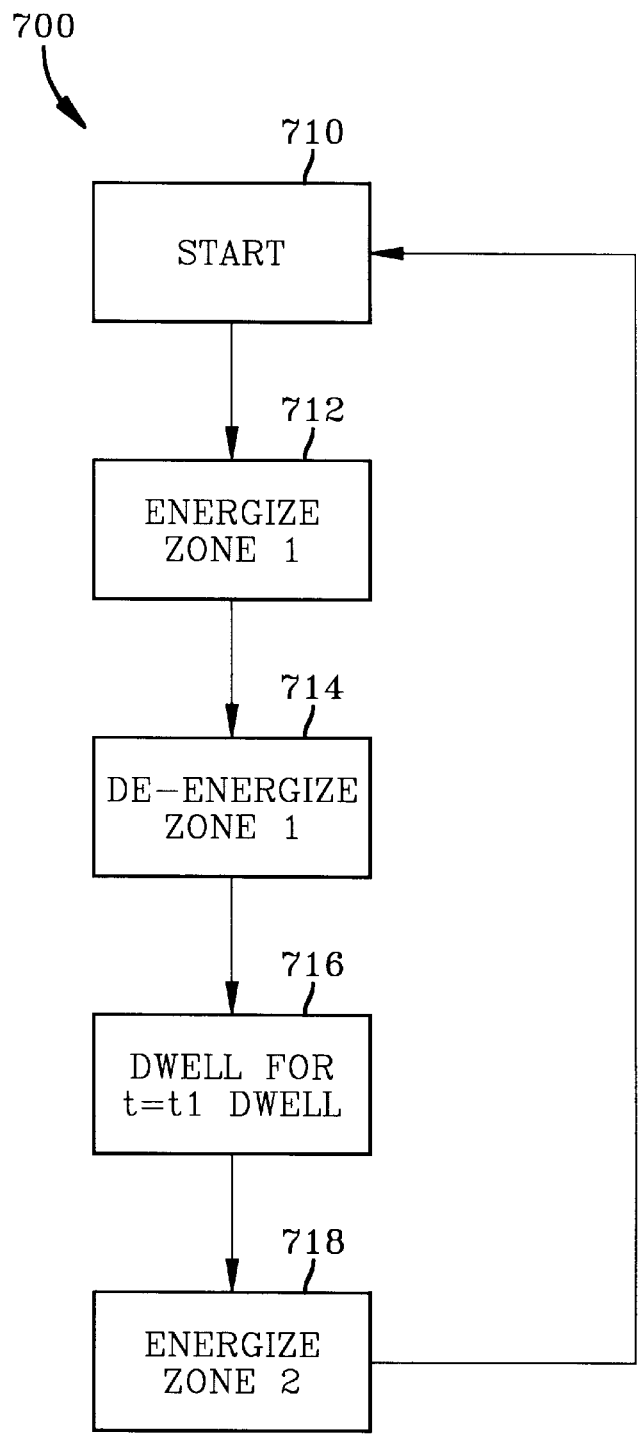
FIG. 7 is a simplified logic flow diagram illustrative if a routine for controlling a deicing system according to an aspect of the present invention.

Referring now to FIG. 7, a simplified logic flow diagram illustrates a first routine for controlling (by controller 234 illustrated in FIG. 2) a de-icing system 700 in accordance with the present invention. The sequence begins with the pilot activating the de-icing system at step 710. The sequence proceeds to step 712 wherein the deflection means beneath ZONE 1 is energized sufficient to induce ice shedding over ZONE 1. The sequence then proceeds to step 714 wherein the deflection means beneath ZONE 1 is de-energized, followed by a dwell period, $t1_{dwell}$, in step 716. The sequence concludes with step 718 wherein the deflection means beneath ZONE 2 is energized sufficient to induce ice shedding over ZONE 2, and the sequence may then be repeated if the aircraft is still flying in icing conditions.

Including the dwell time $t1_{dwell}$ in the cycle is an important feature of the invention. Water droplets continue to impinge upon ZONE 1 after ice sheds over ZONE 1 thereby forming rivulets of water on the surface of the deicer that are blown aft (downstream) into ZONE 2. This condition is commonly referred to as "run-back" in ZONE 2. If ZONE 2 is energized immediately following ZONE 1, the rivulets of water from ZONE 1 continue to flow past ZONE 2 into an unprotected area aft of ZONE 2 where it tends to refreeze. This condition is undesirable for many applications because the runback ice cannot be removed over areas with no deicers or anti-icers, which may be unacceptable for some airfoils in many flight conditions. The dwell time provides a period of time for the runback water to freeze before energizing ZONE 2. According to a preferred embodiment, $t1_{dwell}$ is only slightly longer than the time necessary for ice to begin to form over ZONE 1 after ZONE 1 is de-energized. Therefore, according to an aspect of the invention, runback from ZONE 1 flows into ZONE 2 only during $t1_{dwell}$ while ZONE 2 is de-energized, resulting in refreeze of the runback water over ZONE 2. ZONE 2 is subsequently energized, which causes the runback ice to shed. Without the dwell time, the runback water flows over and past ZONE 2 to an inactive deicing area, and cannot be removed. The dwell period is determined by analysis and/or experiment, with testing in an icing wind tunnel being preferred. The widths of ZONE 1 and ZONE 2 may be adjusted to facilitate this process. For example, the width of ZONE 2 may approximate the distance it takes the runback water from ZONE 1 to refreeze as it is blown along the surface of the deicer. The appropriate widths of the zones may also be determined by analysis and/or experiment.

The volume of runback into aft zones is exacerbated by the presence of a parting strip. Referring again to FIG. 6, water droplets impinging on ZONE PS form rivulets that are blown into ZONE 1 and refreeze when ZONE 1 is de-energized. An ice cap in ZONE 1 blocks runback generated by the parting strip from flowing into ZONE 2. However, when ZONE 1 is energized the ice cap is shed, the water droplets flow past ZONE 1 into ZONE 2. Without a dwell between ZONE 1 and ZONE 2, the runback from ZONE PS, ZONE 1, and ZONE 2 would flow back to an aft area and refreeze where it could not be removed.

Figure 8:
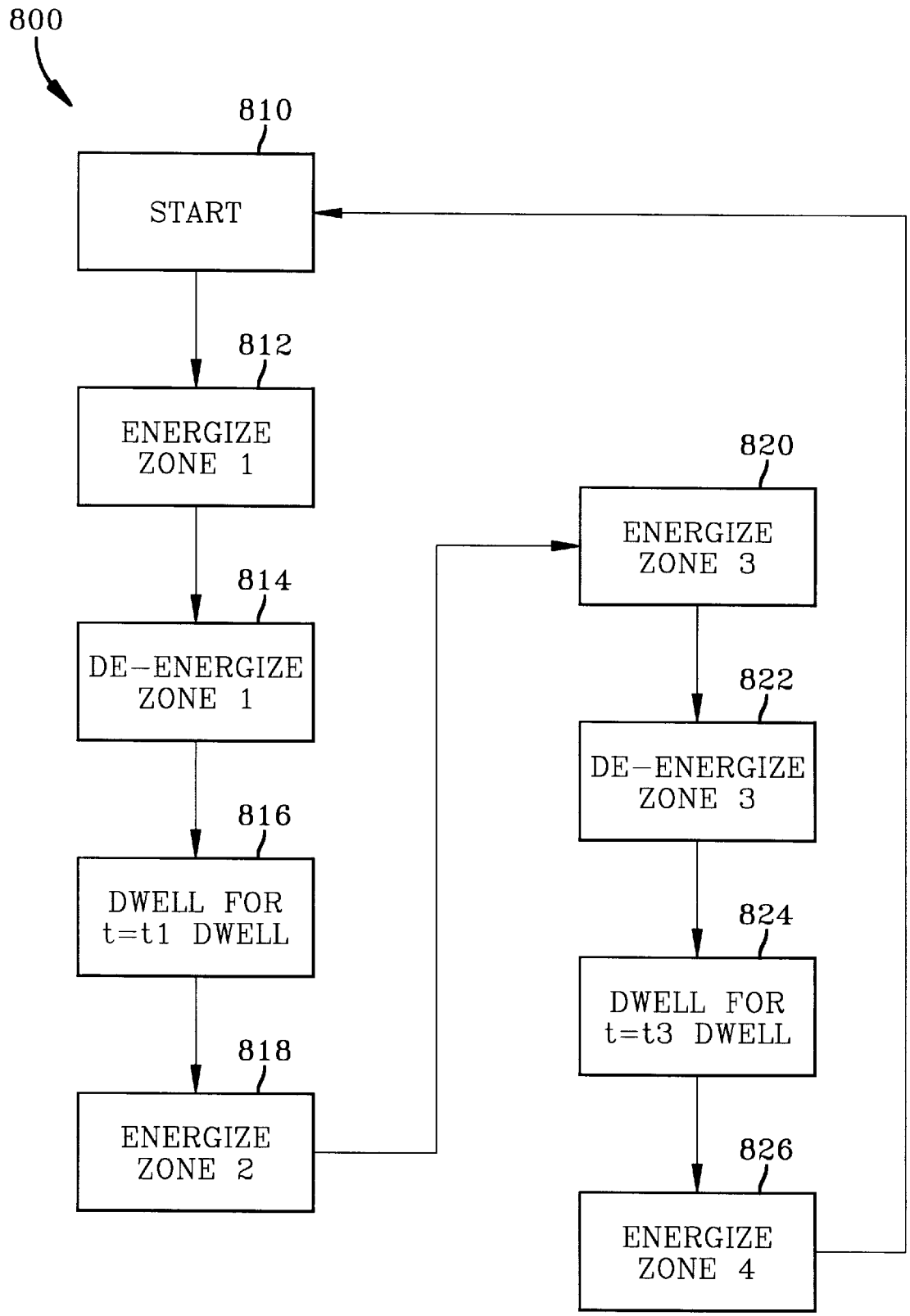
FIG. 8 is a simplified logic flow diagram illustrative if a routine for controlling a deicing system according to another aspect of the present invention.

Referring now to FIG. 8, a simplified logic flow diagram illustrates a second routine for controlling (by controller 234 illustrated in FIG. 2) a de-icing system 800 in accordance with the present invention. The sequence begins with the pilot activating the de-icing system at step 810, followed by energizing the skin deflection means disposed beneath ZONE 1 and ZONE 2 in steps 812, 814, 816, and 818 as previously described with respect to steps 712, 714, 716 and 718 of FIG. 7. Still referring to FIG. 8, the sequence continues with step 820 wherein the skin deflection means disposed beneath ZONE 3 is energized sufficient to induce ice to shed over ZONE 3. The deflection means beneath ZONE 3 is subsequently de-energized in step 822, followed by a dwell period in step 824, $t3_{dwell}$, which serves the same purpose as $t1_{dwell}$ as previously described in relation to FIG. 7. The sequence then proceeds to step 826 wherein the deflection means disposed beneath ZONE 4 is energized sufficient to induce ice shedding over ZONE 4. The sequence may then be repeated if the aircraft is still flying in icing conditions.

In some applications, runback and refreeze may be allowed to accumulate over the secondary zone during a plurality of energization cycles of the primary zone before heating the secondary zone. Additionally, the dwell time may be omitted between two adjacent zones if runback over that surface of the deicer is not critical.

Figure 9:
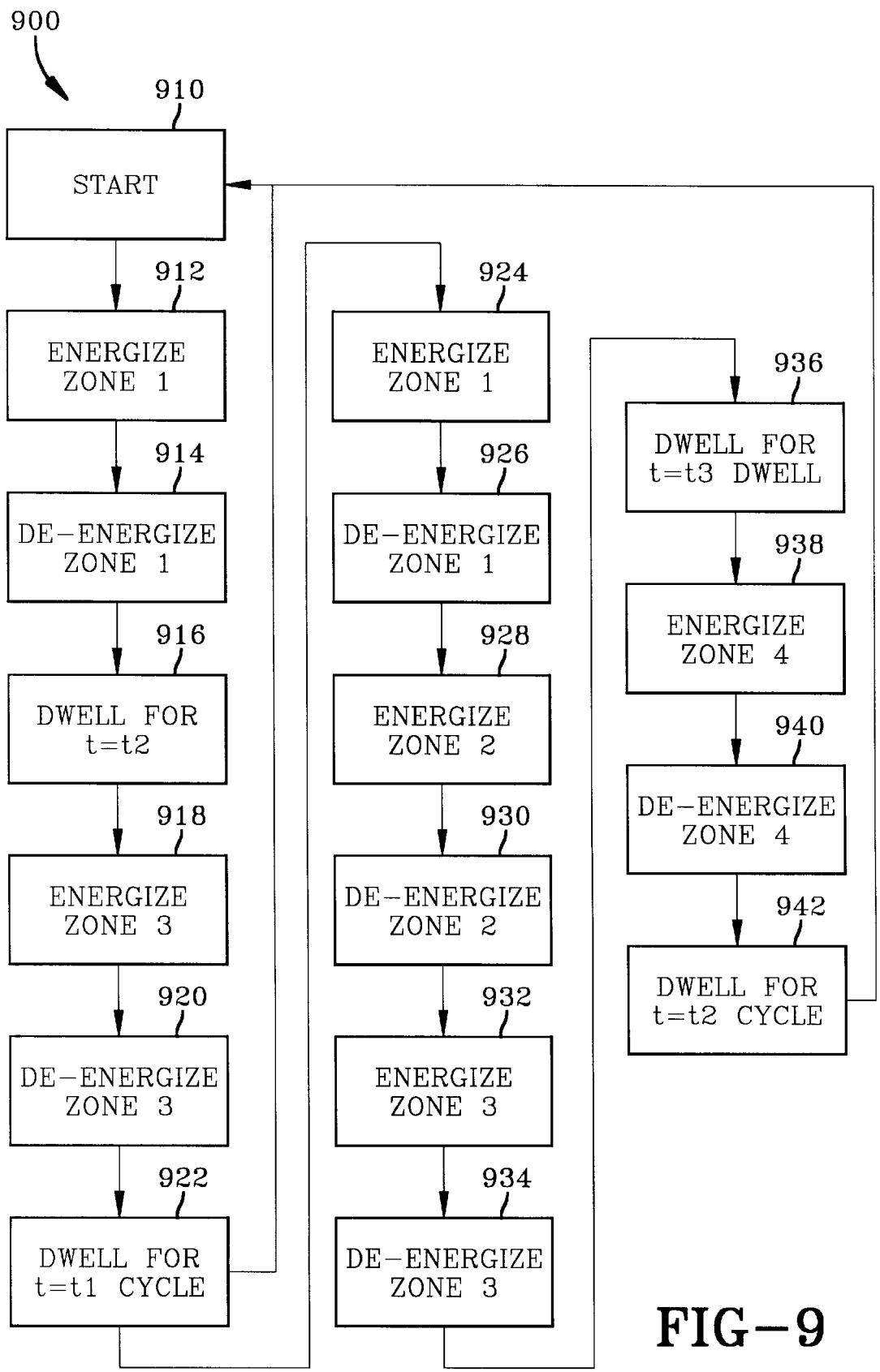
FIG. 9 is a simplified logic flow diagram illustrative if a routine for controlling a deicing system according to another aspect of the present invention.

Referring now to FIG. 9, a simplified logic flow diagram illustrates a third routine for controlling (by controller 234 illustrated in FIG. 2) a de-icing system 900 in accordance with the present invention. Assume the runback and refreeze over ZONE 1 and ZONE 2 is not critical in this application. The sequence begins with the pilot activating the de-icing system at step 910. The sequence then proceeds to step 912, wherein the skin deflection means beneath ZONE 1 is energized sufficient to induce ice shedding over ZONE 1, followed by step 914 wherein the deflection means beneath ZONE 1 is de-energized. A dwell time for a period t2 follows in step 916, followed by energizing the skin deflection means disposed beneath ZONE 3 in step 918 sufficient to induce ice shedding over ZONE 3, and de-energizing ZONE 3 in step 920. A dwell time, $t1_{cycle}$ then follows step 922 during which ice is permitted to accumulate on the deicer (except over the parting strip). Steps 912, 914, 916, 918, 920, and 922 may then be repeated a number of times before cycling ZONES 2 and 4. Ice tends to build faster over ZONES 1 and 3, which requires more frequent removal, and the ice build-up in these zones tends to block ice build-up from droplet impingement in ZONES 2 and 4.

After a plurality of cycles through steps 912, 914, 916, 918, 920, and 922, the sequence continues with step 924 wherein the ice deflection means beneath ZONE 1 is again energized, followed by de-energizing ZONE 1 in step 926. ZONE 2 is then immediately energized (no dwell) in step 928, followed by de-energizing ZONE 2 in step 928. The dwell between ZONE 1 and ZONE 2 is eliminated in this sequence since runback and refreeze is not critical (an assumption for this sequence). The sequence then proceeds with energizing ZONE 3 in step 932, followed by de-energizing ZONE 3 in step 934. A dwell time for a period $t3_{dwell}$ then follows in step 936, $t3_{dwell}$ being sufficient to prevent runback past ZONE 4 (as previously described in relation to FIGS. 7 and 8). Steps 938 and 940 then follow wherein ZONE 4 is energized sufficient to remove ice over ZONE 4, and subsequently de-energized. A final cycle dwell $t2_{cycle}$ may be provided at step 942, after which the whole cycle may be repeated as many times as is necessary.

As is evident from these examples, a variety of cycling sequences are possible that utilize a dwell time between adjacent chordwise shedding zones in order to minimize runback over at least one de-icing surface, any of which are considered to fall within the purview of invention. In addition, it is important to note that skin deflection means disposed beneath other areas of the deicer surface may be energized during the various dwell times discussed above. Cycling may also alternate between deicers disposed over symmetrical left and right aircraft components, such as the horizontal stabilizers of the aircraft. Finally, the times the various zones are energized, and the dwell times between adjacent zones, may be varied depending on outside air temperature and/or flight condition as necessary to achieve specific flight performance requirements, as specified by the airframe manufacturer. The dwell time between adjacent chordwise zones may even be eliminated in some outside air temperature and/or flight conditions is runback is not critical for those conditions. Such variations are considered on a case-by-case basis depending on specifications provided by the airframe manufacturer. Also, as stated above, energization and de-energization may occur over a very short period of time, thereby making it unnecessary to specify de-energization steps.

According to another aspect of the invention, ice may be shed over a fore de-icing zone during cycling of an adjacent aft de-icing zone. For example, referring again to FIG. 6, ice over ZONE 1 can be shed when ZONE 2 is energized, without energizing ZONE 1. Shedding over ZONE 1 is induced by chordwise energy transfer from ZONE 2. The amount of deflection used to energize ZONE 2 may be adjusted to achieve this purpose. This effect may be utilized to eliminate cycling of ZONE 1, which reduces total cycle time of the deicer, and is particularly effective if ZONE 1 is disposed adjacent a parting strip. Chordwise heat transfer from ZONE PS tends to assist ZONE 2 in removing ice over ZONE 1. This effect is particularly useful with a metal surfaced deicer, and is especially useful if an aluminum aircraft skin forms the exposed surface upon which ice accumulates.

Figure 10:
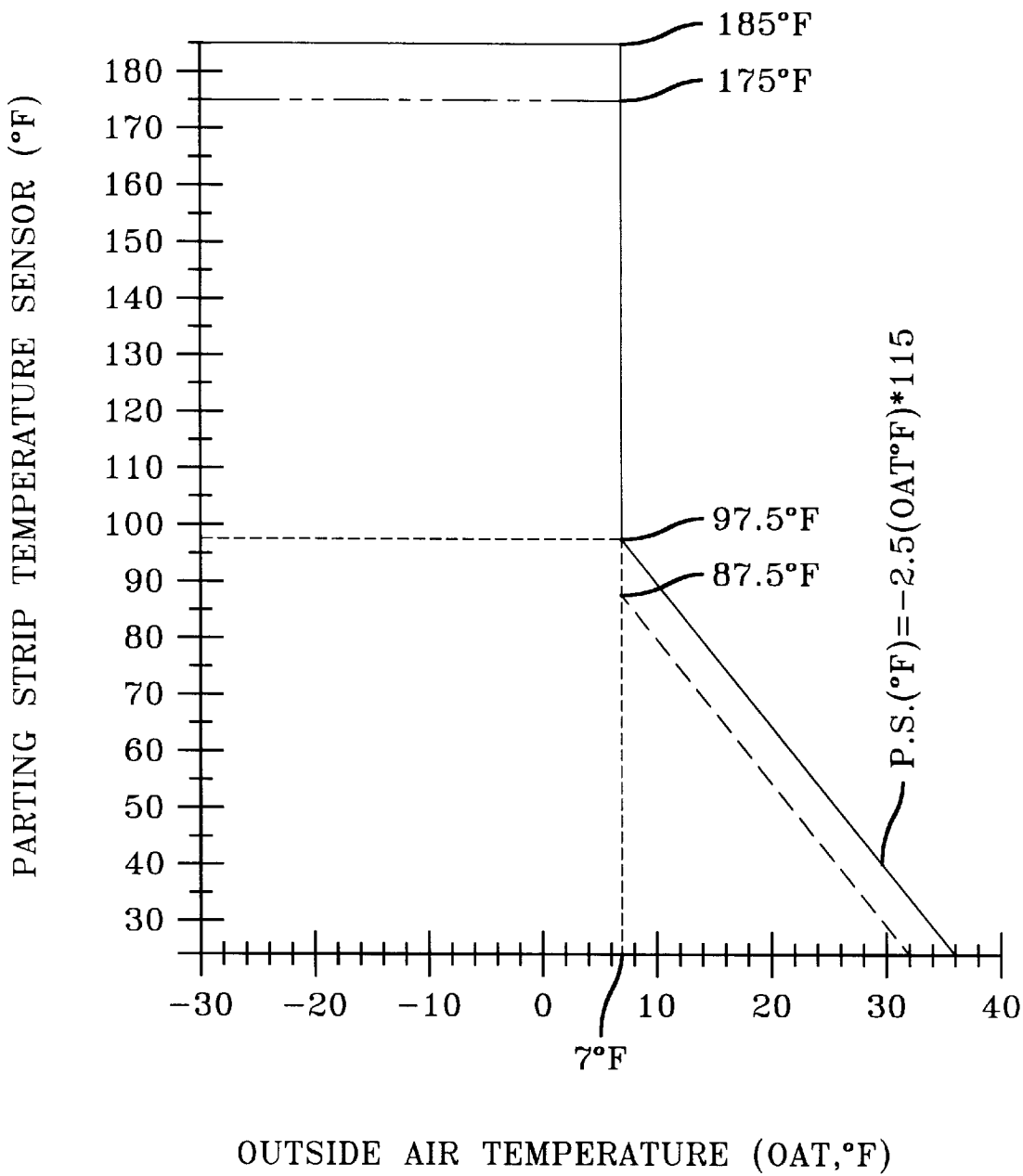
FIG. 10 is a plot showing parting strip zone temperature setpoints versus outside air temperature.

According to yet another aspect of the invention, parting strip heating element temperature may be changed depending on outside air temperature in order to minimize runback. The heating element temperature would be controlled by controller 234 of FIG. 2 using input from the temperature sensor 50. The purpose of the parting strip is to prevent ice formation in the vicinity of the stagnation line and split the ice cap into upper and lower pieces over the shedding zones. The amount of energy necessary to accomplish this purpose changes dramatically with outside air temperature. A parting strip designed to properly split the ice cap at −22° F. can cause a large portion, or the entire deicer, to run wet at warmer temperatures due to chordwise heat transfer. The amount of power generated by the parting strip element may be decreased as outside air temperature increases as necessary to confine the running wet to the parting strip, while maintaining the desired parting strip function. According to a preferred embodiment, the parting strip element is energized by applying an electrical potential across the element. The electrical potential has a constant average value, and is cyclically applied as necessary to maintain the parting strip element temperature between upper and lower setpoints. For example, temperature sensor 50 of FIG. 2 may provide feedback to controller 234. The controller 20 energizes the parting strip element of the element temperature is below a lower setpoint, and de-energizes the parting strip element if the element temperature is above an upper setpoint. In cold conditions, the element temperature may never exceed the upper setpoint, which results in power being constantly supplied to the parting strip heating element. As outside air temperature increases, the controller can automatically lower the parting strip temperature setpoints, which causes the power to cycle. An outside air temperature input to controller 234 may be provided for this purpose. Decreasing the temperature setpoints decreases the average power generated by the parting strip, and reduces chordwise heat transfer in the warmer conditions. Parting strip performance may thus be maintained while minimizing chordwise heat transfer and runback at warmer conditions. Other variations may be applied to achieve this purpose. For example, an electrical potential could be constantly applied to the parting strip, and the magnitude of the potential could be decreased as outside air temperature increases in order to reduce the average power consumption of the parting strip element. Any such variations are considered to fall within the purview of the invention. FIG. 10 is a plot showing parting strip zone temperature setpoints versus outside air temperature.

The temperature sensor 50 is preferably a thin film resistive wire grid sensor (RTD), such as those available from RDF Inc. (model 24777), Minco, Tayco, etc., that changes resistance in response to changes in temperature. It may be bonded to the back of heating element 201 or bonded into the deicer on the inner surface of the aluminum skin so that it will closely follow the temperature of the iced or clear outer surface. The preferred bonding agent for this purpose is the bonding agent recommended by the RTD supplier. The sensor is also in close proximity to the heating element and therefore allows effective over temperature control for the element. The thermodynamic characteristics of skin may cause the temperature at sensor 50 to be different than the temperature at the skin surface. The electrical signal provided by sensor 50 may therefore have to be conditioned or calculated to account for this phenomenon. To this end, sensor 50 may also be located near or at the skin surface to obtain a more accurate measurement of true temperature at the surface. It is to be noted that sensor 50 could be disposed in any of a number of other places to monitor temperature. Of course, temperature measurements may be taken above more than one heating element utilizing a multiplicity of sensors.

The controller 234 (FIG. 2), whose function is described hereinbefore, may be constructed in any of a number of ways well known in the art. For instance, the controller may be comprised of an on board computer which implements the heater cycling sequence utilizing a software program. The exemplary embodiments herein are described as being implemented within a program of a digital deicing to control, the flowchart of which is illustrated in the Figures hereinbefore. The particular characteristics of the deicing controller are irrelevant, so long as it is of the type that controls the electrical power application to the heater elements. Various types of suitable switches may be used, including mechanical switches, electromechanical switches, and solid-state switches. The invention may be implemented with dedicated digital or analog hardware if desired. In such a case, it may be implemented in a different fashion from that disclosed herein in accordance with the general equivalence between software as shown herein and dedicated digital hardware and software. Of course, the present invention may be implemented within a digital automatic flight control system computer. All of the foregoing is irrelevant to the invention, it suffices to select the aspects thereof which are desired to be utilized and to provide suitable signal processing to achieve the desired result in accordance with the invention, in a manner suited to the intended implementation or aircraft use.

Figure 11:
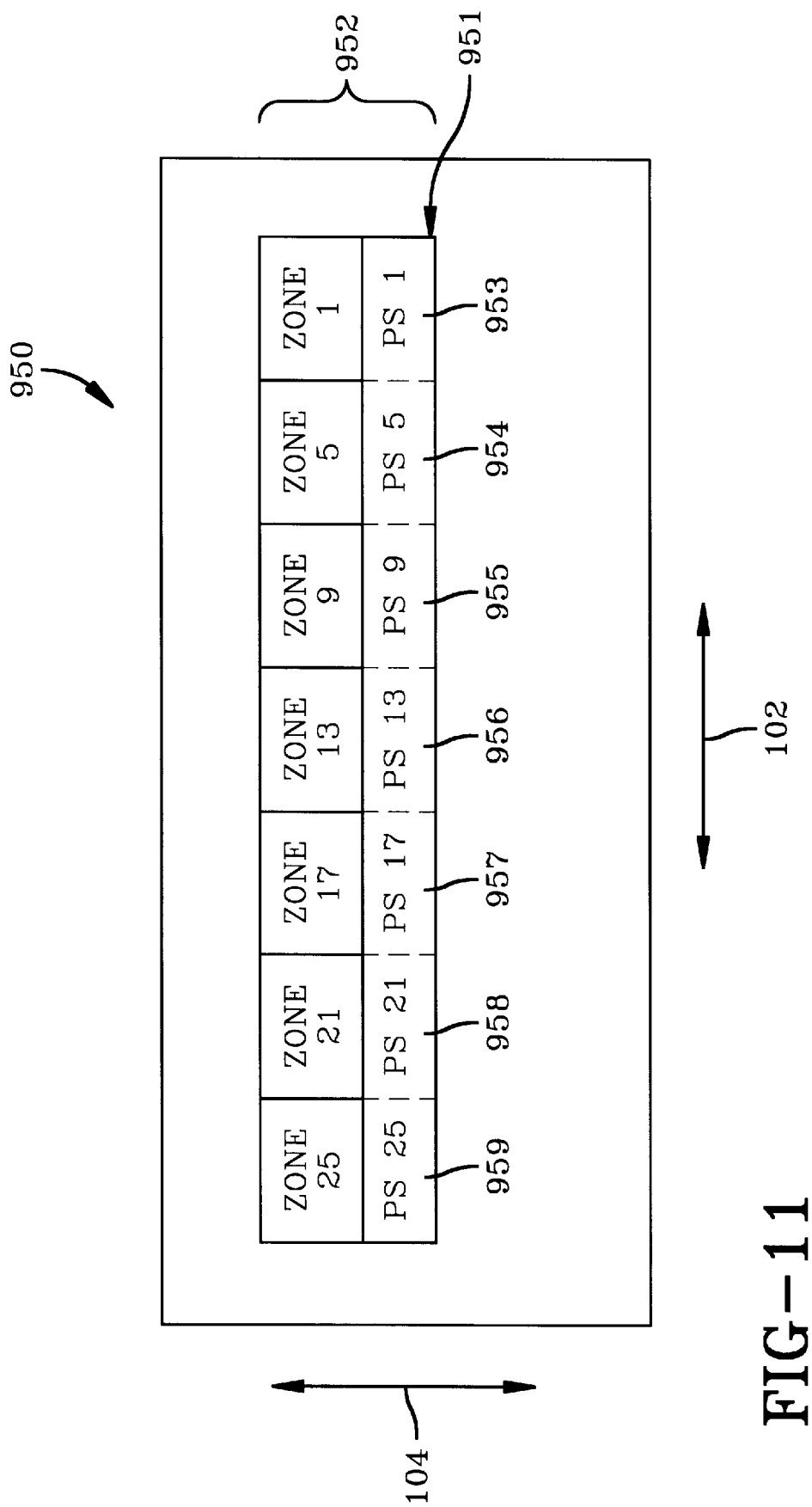
FIG. 11 is a plan view of an deicer having a parting strip and a plurality of deicing zones in accordance with another aspect of the present invention.

Referring now to FIG. 11, an alternative arrangement for a deicer 950 in accordance with the present invention is to provide a single primary skin deflection area 952 on the upper part of the airfoil adjacent to the parting strip or skin heating zone 951. The skin deflection area 952 is comprised of Zones 1, 5, 9, 13, 17, 21 and 25 and is located on the upper or top half of the airfoil. The parting strip or skin heating zone 951 may be operated by the controller either as a parting strip heater for deicing purposes instead of anti-icing purposes. The parting strip could be divided up into a number of separately controlled zones as illustrated and each section or zone could be cycled on and off to minimize power consumption. During the off period of a section, ice is allowed to accumulate thereupon. The section is then cycled on for a short period of time to melt the bond between the ice cap and the skin. One or more of the skin deflection means chordwise aft of the newly heated section is then actuated, thereby shedding ice over both the skin deflection means and the skin heating means. Normally, the ice cap over the stagnation line of the airfoil is difficult to shed using only mechanical deflection due to the airflow pressing the ice cap against the leading edge and the dampening effect of the high radius of curvature over the leading. To this end, the leading edge at the stagnation line could be permitted to flex inward during energization of the skin deflection means, as described in commonly owned U.S. Pat. No. 5,314,145 entitled Compressible Nose Dynamic De-icer, the disclosure of which is hereby fully incorporated herein by reference.

Figure 12:
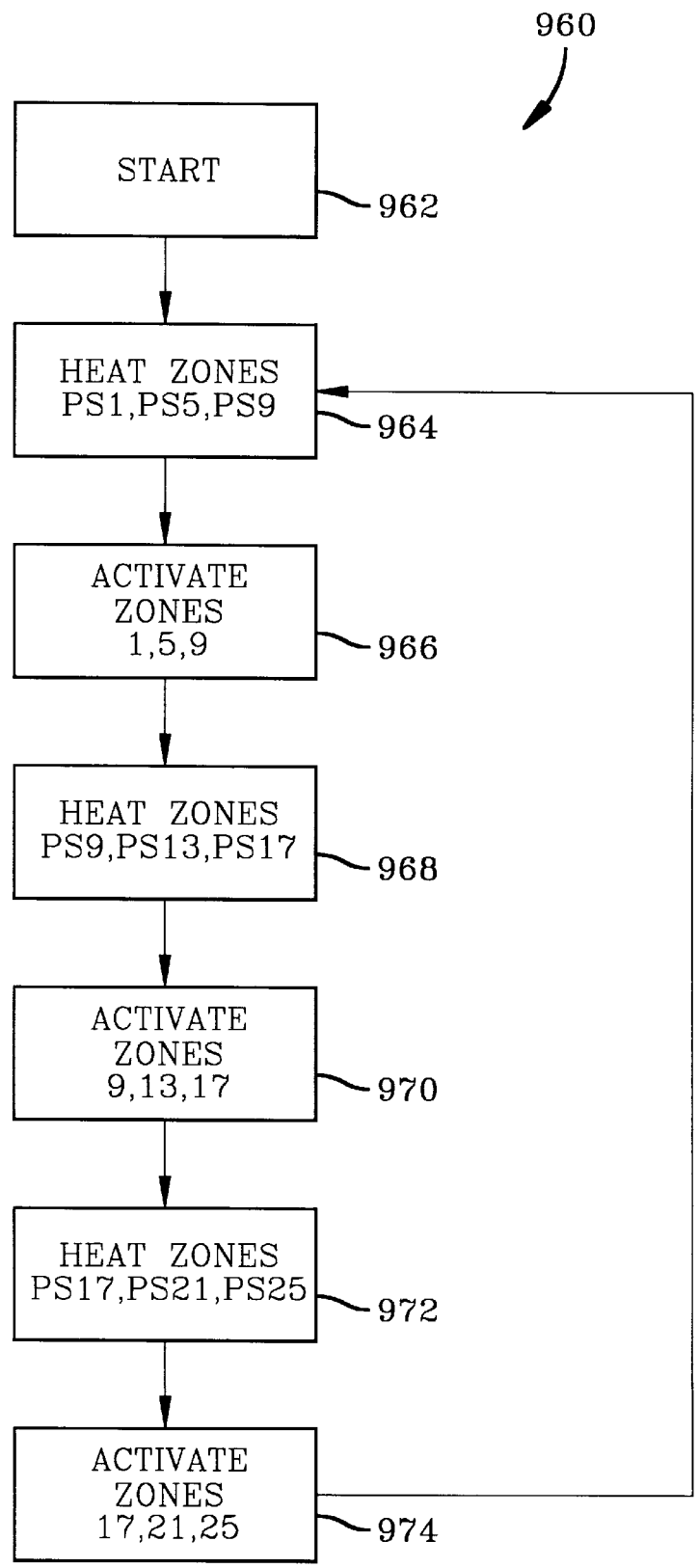
FIG. 12 is a simplified logic flow diagram illustrative if a routine for controlling a deicing system according to another aspect of the present invention.

Referring now to FIG. 12, an alternative controller 960 sequence for energizing parting strip zones PS1, PS5, PS9, PS13, PS17, PS21, PS25, and activating the skin deflection members in Zones 1, 5, 9, 13, 17, 21 and 25 of FIG. 11 is to heat and cycle the zones with a spanwise overlap to promote and improve ice shedding. The sequence starts with a step 962. Next, parting strip zones PS1, PS5, PS9 are energized long enough to melt or shed ice thereover in a step 964.

Next, zones 1, 5, and 9 are activated or energized in a step 966. Next, parting strip zones PS9, PS13, PS17 are energized long enough to melt or shed ice thereover in a step 968. Next Zones 9, 13, and 17 are activated in a step 970. Next, parting strip zones PS17, PS21, PS25 are energized long enough to melt or shed ice thereover in a step 972. Next, Zones 17, 21 and 25 are activated in a step 974. The cycle is then repeated again if necessary.

It is to be noted that the deicer 950 of FIG. 11 could also have a singular parting strip such as those described hereinbefore in previous figures. Steps 964, 968 and 972 of FIG. 12 would thereby be unnecessary.

Controller 234 may also control the deicer in accordance with commonly owned U.S. patent application Ser. No. 08/664,883 entitled ELECTROTHERMAL DEICING SYSTEM, the disclosure of which is hereby fully incorporated herein by reference. The primary and secondary shed zones described in that application would be comprised of the skin deflection means of the present invention.

Although the invention has been described with reference to certain and preferred embodiments, including the best embodiments, it would be apparent to people skilled in the art of de-icing of aircraft that other variations are possible which are obvious thereover. There variations are intended to be included by the present specification and appended claims.

We claim:

1. A deicer adapted for attachment to a substructure, the deicer having an outer skin to be attached to the substructure, the substructure having an apex underlying the area of the outer skin where the radius of curvature is smallest, the deicer comprising:

a heater disposed beneath the outer skin at a first area near the apex of the substructure for heating the outer skin when energized to thereby melt ice accumulated over the first area;

at least one skin deflector disposed beneath the outer skin at a second area chordwise aft of the first area for deflecting the outer skin away from the substructure when energized; and controller for periodically energizing the heater and cycling the skin deflector a predetermined dwell time after each time the heater has been energized.

2. A deicer in accordance with claim 1, wherein the skin deflector is comprised of a plurality of skin deflector elements.

3. A deicer adapted for attachment to a substructure, the deicer having an outer skin to be attached to the substructure, the substructure having an apex underlying the area of the outer skin where the radius of curvature is smallest, the substructure running in a chordwise and spanwise direction, the deicer comprising:

a heater disposed beneath the outer skin at a first area near the apex of the substructure for heating the outer skin when energized to thereby melt ice accumulated over the first area;

a first skin deflector disposed beneath the outer skin at a second area chordwise aft of the first area for deflecting the outer skin away from the substructure at said second area when energized;

a second skin deflector disposed beneath the outer skin at a third area chordwise aft of the second area for deflecting the outer skin away from the substructure at said third area when energized; and controller for periodically energizing the heater and cycling the first and second skin deflectors after each time the heater has been energized.

4. A deicer in accordance with claim 3, wherein the skin deflectors are comprised of a plurality of skin deflector elements.

* * * * *